United States Patent Office 2,914,857
Patented Dec. 1, 1959

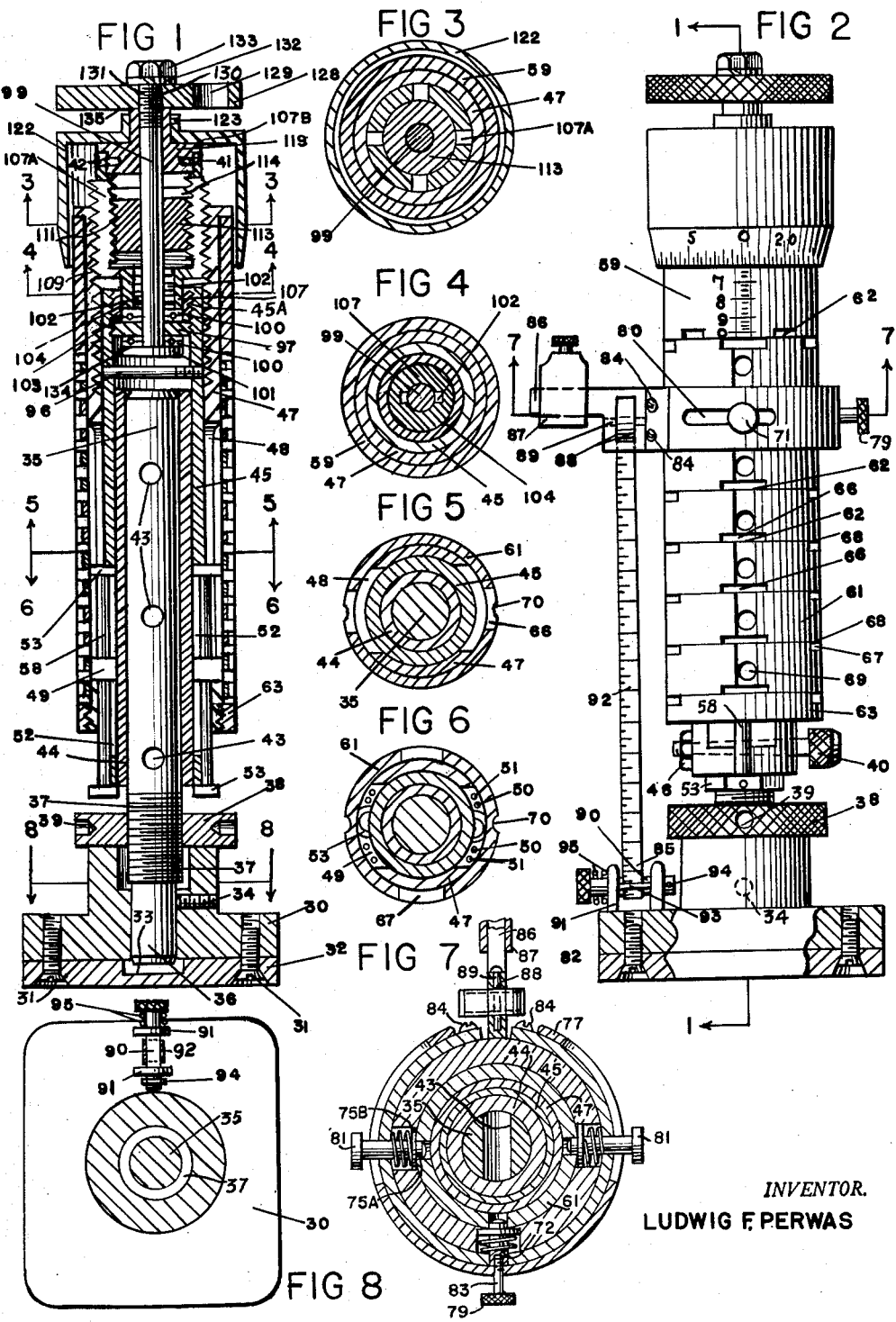

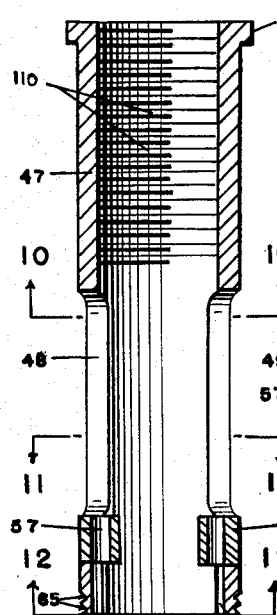
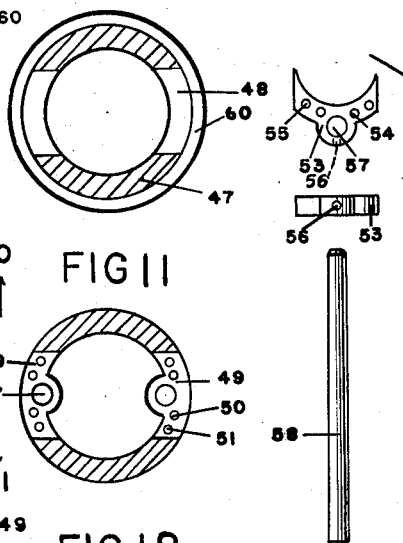
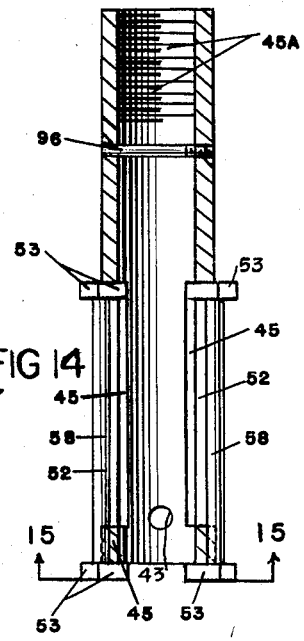
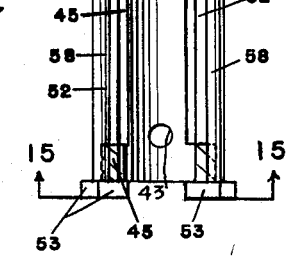
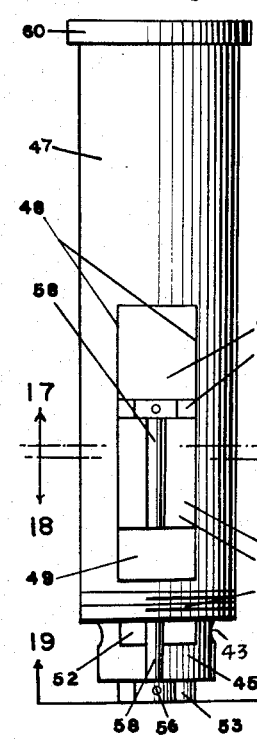
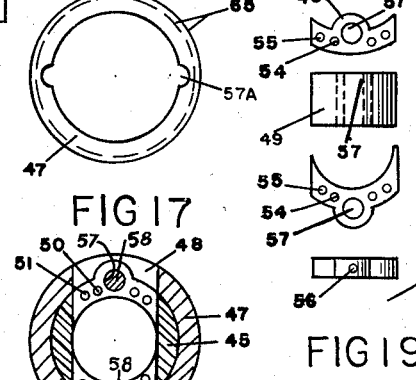
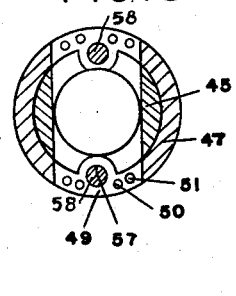
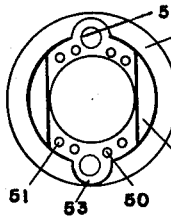
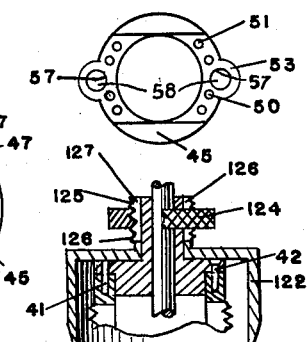
INVENTOR.
LUDWIG F. PERWAS Dec. 1, 1959  L. F. PERWAS  2,914,857
TUBULAR TELESCOPING MICROMETER HEIGHT GAGES
Filed Oct. 17, 1955  3 Sheets-Sheet 3
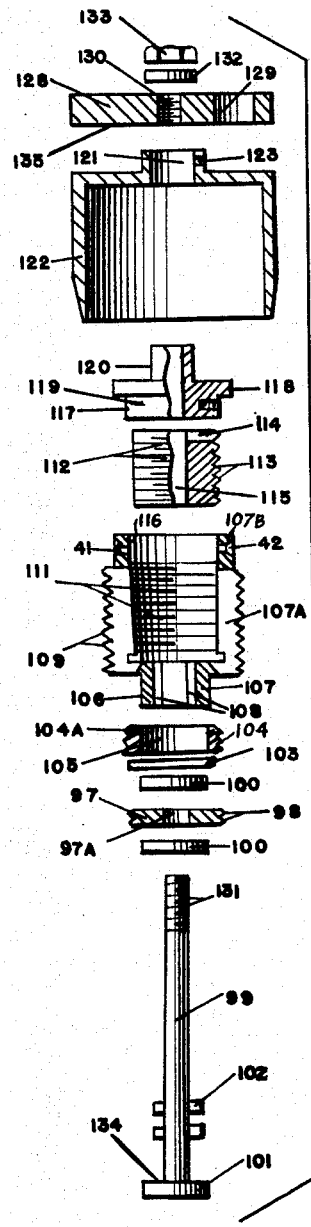
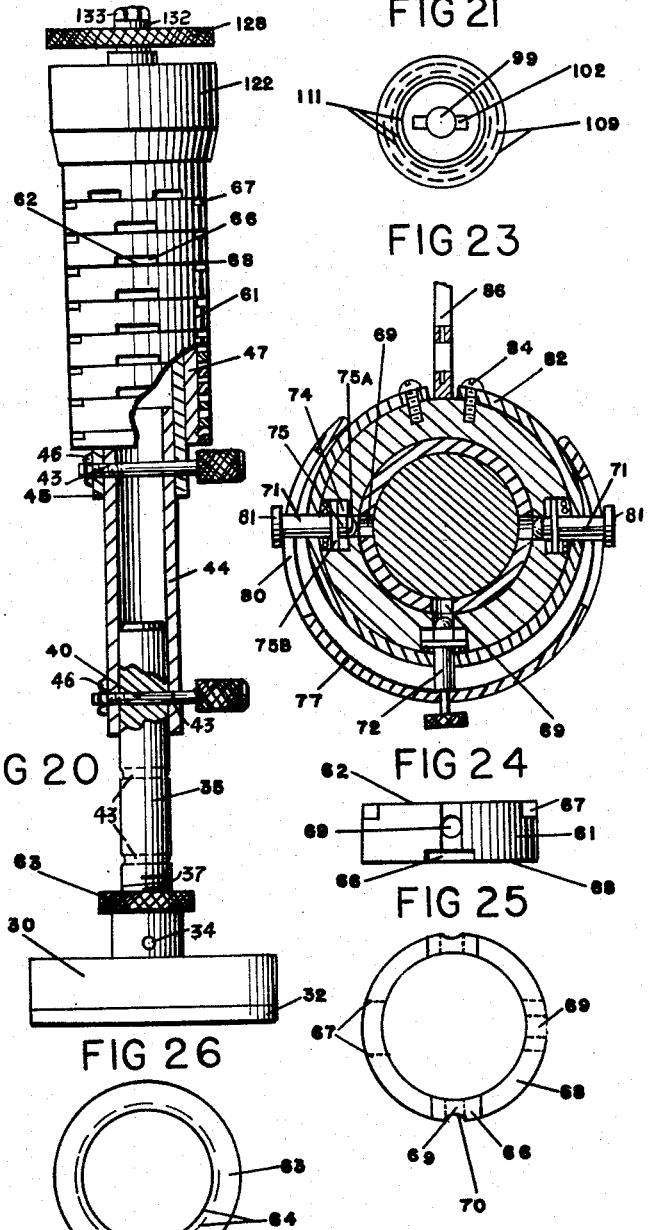
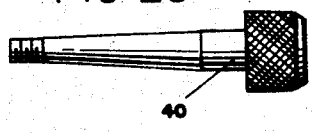
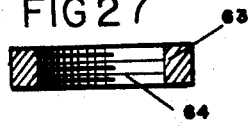
INVENTOR.
LUDWIG F. PERWAS

2,914,857

TUBULAR TELESCOPING MICROMETER HEIGHT GAGES

Ludwig F. Perwas, New York, N.Y.

Application October 17, 1955, Serial No. 540,845

2 Claims. (Cl. 33—170)

My invention relates to new and useful improvements in tubular height gages.

An important object of my invention is the provision of a tubular construction whereby an outer tube moves in a vertical direction by a unique micrometer screw arrangement and combination resulting in precision micrometer readings.

A related object of my invention is the provision of one or more rod-like keys for greater accuracy.

Another object of my invention enables the device to be utilized at various heights due to its telescopic and collapsible construction.

Another object of my invention due to the telescopic and collapsible construction permits the device to be stored or kept in a standard size tool box.

Another object of my invention is to provide for securing an indicator or scriber to a slide for using the device as a standard height gage to take direct readings.

Still another object of my invention is to provide means for securing a collapsible self-winding tape measure, or rule.

One of the most important objects of my invention is the provision of a device of the above mentioned character that is simple, sturdy and compact in its construction.

With the above and other objects and advantages in view, the invention consists of the novel details of construction, arrangement and combination of parts more fully hereinafter described, claimed and illustrated in the accompanying drawings in which:

Figure 1 is a vertical sectional view of an embodiment of the invention taken along the line 1—1 of Figure 2.

Figure 2 is a vertical view of an embodiment of the invention.

Figure 3 is a cross-sectional view taken along the line 3—3 of Figure 1.

Figure 4 is a cross-sectional view taken along the line 4—4 of Figure 1.

Figure 5 is a cross-sectional view taken along the line 5—5 of Figure 1.

Figure 6 is a cross-sectional view taken along the line 6—6 of Figure 1.

Figure 7 is a cross-sectional view taken along the line 7—7 of Figure 2.

Figure 8 is a cross-sectional view taken along the line 8—8 of Figure 1.

Figure 9 is a sectional view of the outside micrometer sliding tube 47 and guide bushing 49, as illustrated in Figure 2.

Figure 10 is a cross-sectional view taken along the line 10—10 of Figure 9.

Figure 11 is a cross-sectional view taken along the line 11—11 of Figure 9.

Figure 12 is a bottom view of Figure 10 omitting the guide bushing 49.

Figure 13 is a sectional view of the inside micrometer extension anchor tube 45 and the rod-like keys 58 and related brackets 53 as illustrated in Figure 2.

Figure 14 is an exploded front and top view of the brackets 53, guide bushing 49 and the shaft 58 illustrating their relative position when assembled.

Figure 15 is a bottom view of Figure 13.

Figure 16 is a view similar to Figure 2 position and illustrating the outside micrometer sliding tube 47, the inside micrometer anchor tube 45, the rod-like keys or shafts 58, the brackets 53 and the guide bushing 49.

Figure 17 is a cross-sectional view taken along the line 17—17 of Figure 16.

Figure 18 is a cross-sectional view taken along the line 18—18 of Figure 16.

Figure 19 is a bottom view taken along the line 19—19 of Figure 16.

Figure 20 is an exploded view of the micrometer mechanism as shown in Figure 1.

Figure 21 is a view illustrating certain constructional details of the device.

Figure 22 is a front elevation of an embodiment of my invention illustrating the telescopic features when fully extended.

Figure 23 is a cross-sectional view similar to Figure 7 except that the spring cam band 76 and the related working parts are shown in a disengaged position.

Figure 24 is a front elevation view of the precision measuring ring.

Figure 25 is a bottom view of Figure 24.

Figure 26 is a top view of the knurl adjusting nut 38.

Figure 27 is a front sectional view of Figure 26 taken along any diameter of Figure 26.

Figure 28 is a front view of the line up pin 40 as shown in Figures 2 and 22.

Figure 29 is a sectional view illustrating another way of securing the micrometer thimble 123 to the thimble support 120 and the thimble support 120 to the micrometer adjusting screw 108.

Referring more in detail to the drawings a base 30 has secured to the bottom by screws 31 a plate 32 having a clearance recess 33 and said base 30 has a set screw 34 for securing the shaft or tube 35 rigidly to said base 30. The shaft or tube 35 has an accurate diameter 36 engaging a corresponding precision recess in the base 30 and above the diameter 36 the shaft or tube 35 is threaded at 37 for engaging a threaded bore in the adjusting knurled nut 38. By engaging spanner wrench holes 39 or gripping the knurl of the adjusting nut 38 and manipulating it the shaft or tube 35 may be caused to move in a vertical direction. This permits accurately setting the distance from the bottom of the base 30 to the pins 40 or to the measuring surface 62 of the circular ring 61 according to the unit measurement of one inch.

The shaft or tube 35 is further provided with several alignment holes 43 whose centers are precisely set the same number of units apart to permit the device to be held extended to a desired height within the device's limit by engaging said alignment holes 43 and similar holes 43 provided in the extension tube 44 and inside micrometer extension anchor tube 45 with a taper pin 40 having a nut 46 for securing said taper pin 40 firmly in place. The extension tube 44 has several alignment holes 43 the same as the shaft 35 but the inside micrometer extension anchor tube 45 is provided with only one hole through both sides of the tube 45. The tube 45 is secured to one end of the extension tube 44 and the shaft 35 is secured to the other end thereby extending the device to its extreme height as shown in Figure 22.

The outside micrometer sliding tube 47 moving in a vertical direction only is provided with suitable precision keying means by providing slot 48 in said tube 47 and securing the guide bushing 49 to the said tube 47 by means of the screws 50 and dowel pins 51 after the inside micrometer extension anchor tube 45 and the sliding tube 47 have been engaged with slots 48 and 52 in line. The anchor tube 45 has secured by means of screws 50 and dowel pins 51 within the clearance slot 52 a bracket 53 having screw holes 54, dowel holes 55, dowel pin 56 and rod or shaft hole 57. On the outside of the anchor tube 45 in line with bracket 53 another bracket 53 is secured in place. The rod or shaft 58 engages the rod hole 57 in the outside bracket 53 and then passes through the clearance slots 57A which line up with the hole 57 in the guide bushing 49 that is secured to the sliding tube 47. Then, passing through the clearance slots 48 and 52, it engages the rod hole 57 in the bracket 53 that is secured to the anchor tube within the slot 52. This combination and arrangement keys the anchor tube 45 and the sliding tube 47 in a manner so as to eliminate excessive lateral or horizontal play which is vitally required for the accurate operation of the micrometer mechanism in relation to the sliding tube 47 and anchor tube 45. The length of the shaft 58 is long enough to permit the sliding tube 47 to move in a vertical direction exceeding the unit measurement which is illustrated as one inch.

The tubular graduated ring 59 is mounted on the sliding tube 47, abutting against the flange 60 of the said tube 47 and followed by the tubular gage rings 61 which may vary from several in number to many. The gage ring faces or measuring surfaces 62 and 68 are made accurately to the unit measurement of one inch as to size, parallelism, etc. within a few millionths. The graduated ring 59 and the gage rings 61 are secured to the sliding tube 47 by the lock ring 63 by means of the threaded bore 64 engaging the threaded outside diameter 65 of the sliding tube 47.

The gage rings 61 are provided with marginal clearance slots 66 so as to permit a person to utilize the device as a multiple planar height gage in conjunction with a standard height gage to be able to take over-surface readings from the measuring surfaces 62. This is accomplished by manipulating the micrometer thimble 122 so that the sliding tube 47 moves vertically up or down until it is in a suitable position for a reading to be taken from the indicator on the standard height gage being utilized, which contacts the measuring surface 62. The marginal clearance slot 67 is provided for taking under-surface readings from the under-surface 68 when the device is used as a planar gage.

The gage rings 61 are also provided with three bores 69 accurately located in the same horizontal plane and spaced ninety degrees apart. The distance of the bores 69 from one gage ring 61 to the next adjacent gage ring 61 along the vertical line is precisely one inch. The vertical slots 70 are axially aligned with the bores 69 to act as guides for the lock pins 71 as the indicator and scriber slide 73 (Fig. 7) is moved up or down to permit the lock pins 71 and 72 to engage the bores 69 in one of the selected gage rings 61 for securing said slide in an integral inch position.

The slide 73 is provided with three counterbores 74 having a through hole the same size as the bores 69 for receiving the pin 75 which is provided with a semi-circular end 75A for engaging the bores 69 and a flange 75B to maintain the pin 75 in proper position during operation of the spring cam band 77. The lock pins 71 and 72 are actuated by the spring cam band 77 and the compression springs 78. The pin 72 is drawn back by gripping the knurled knob 79 and pulling outward, causing by the construction of the slots 80 the spring cam band 77 to disengage by cam action the pins 71 as the cam band 77 applies pressure to the pin flanges 81 (Fig. 23). After moving the slide 73 into a selected position the lock pin 72 is pressed in to engage the bore 69, actuating the spring cam band 77 in a manner so as to permit the springs 78 to engage the lock pins 71 in bores 69 by applying the release pressure of the said springs 78 to the flanges 75B.

Incorporated in the slide 73 is a conventional indicator and scriber holder 86 and a standard clamp 87. The indicator or scriber holder 86 is an integral part of the slide 73. The two circles not numbered are screws for securing in position the retaining band 82.

The spring retaining band 82 which has a corresponding recess for each of the lock pins 71 and a recess to receive the pin 72 having its own knurled knob 79, is maintained in position by the spring tension and the screws 84, thereby retaining the lock pins 71 and 72 in place.

If the device is being used as a multiple planar height gage in conjunction with a standard height gage, surface gage, etc. the slide 73 is positioned at the highest or top gage ring 61 and a self-winding flexible rule 92 housed in the slot 88 and secured in place by the shaft 89 is utilized by securing to the shaft 90, mounted in the brackets 91 which are an integral part of the base 29, the loose end 85 of the rule 92 by passing end 85 through the slot 93. Then, the shaft 90 is revolved until the measurement indicated on the tape is the same as the distance of the center line of the tapered pin 40 above the surface of the surface plate or other flat area on which the device is being used. The shaft 90 is held in place by the press fitted pin 94 and the compression spring 95. The compression spring 95 prevents the self-winding rule from automatically re-winding.

Mounted in the anchor tube 45 is a safety pin 96 which prevents the telescoping extension tube 45 and shaft 35 from damaging the micrometer mechanism due to careless handling of the device. Said safety pin 96 may have a resilient tube covering the portion within the tube 45.

To assemble the micrometer mechanism an anchor plate 97 is secured to the anchor tube 45 by engaging the threads 98 of the anchor plate 97 with the inside threads 45A of the anchor tube 45, and then a drive shaft 99 receives a thrust bearing 100 that engages the flange 101. The shaft then passes freely through the anchor plate bore 97A and then through another thrust bearing 100 above which drive pins 102, Figure 21, are fitted in the shaft 99. A spring lock washer 103, Figure 20, engages the shaft 99 followed by a threaded bushing 104 that engages the threads 45A. The anchor plate 97 may be secured firmly in place by engaging the screw slot 104A. The threaded bushing 104 has a bore 105 for receiving the reduced end 106 of the micrometer adjusting screw 107 which has a keyway slot 108 for engaging the drive pins 102. The numeral 107 indicates the adjusting screw or micrometer screw, and 107A indicates the slots in the micrometer adjusting screw which permit the micrometer threads or outside threads of the member 107 to be adjusted by the tapered adjusting plug 113 so as to properly engage the inside micrometer threads of the sliding tube 47, and 107B is the reduced end of element 107. The large exteriorly threaded portion 109 of the micrometer adjusting screw 107 has 40 threads to the inch and engages a similar inside thread 110 of the outside micrometer sliding tube 47. The adjusting screw 107 has a tapered threaded bore 111 for receiving the threaded outside 112 of the taper adjusting plug 113 which is provided with a screw slot 114 for adjusting said plug 113 so as to obtain a close no play free moving fit between the adjusting screw 107 and the sliding tube 47. The taper adjusting plug 113 has a bore 115 to permit the drive shaft 99 to pass through. In the top of the micrometer adjusting screw 107 is an accurate bore 116 for receiving the reduced portion 117 of the thimble support 119. The bore 116 is deep enough for the shoulder 118 of the support 119 to firmly seat against the top of the micrometer screw 107. Screws 42 and dowel pins 41 secure the thimble support 119 to the micrometer adjusting screw 107 so that the two parts act as one unit. The thimble support 119 is provided with a shouldered extension 120 to engage the bore 121 of a standard micrometer thimble 122 whose circumference is graduated into twenty five thousandths and each thousandth into ten thousandths of an inch. The micrometer thimble 122 is secured to the thimble support 119 by the set screw 123. A knurled nut 128 has a large outside diameter and an index finger recess 129 for manipulating nut 128 in a spinning manner to lower or raise the sliding tube 47, and disc 128 has a centered threaded recess for engaging the threaded end 131 of the drive shaft 99. Following the disc 128 a spring lock washer 132 engages the shaft 99, followed by a nut 133 for securing the knurled nut 128 in position after the proper amount of play is allowed between the shoulder face 134 of the flange 101 and the face 135 of the knurled nut 128.

In Figure 29 instead of the set screw 123 being used for securing the micrometer thimble 122 to the thimble support 119 it is accomplished by a nut 124 having a tapered thread which engages a tapered thread 125 of the micrometer thimble 122 and said threads 125 being slotted at 126 so as to form resilient gripping tongue-like projections 127. The tightening of the nut 124 forces the projections 127 against the thimble support 120, securing the micrometer thimble 122 firmly to support 119.

It is to be understood that the form of my invention, herewith shown and described, is to be taken as a preferred example of the same, and that various changes in the size, shape and arrangement of parts may be resorted to without departing from the scope of my invention, or of the appended claims.

Having thus described my invention, I claim:

1. A tubular height gage comprising, keying means, a sliding tube having inside micrometer threads, an anchor tube, a bracket secured to said anchor tube within a clearance slot, another bracket secured to the outside face of said anchor tube in line with the first named bracket, said brackets engaging a shaft, a guide bushing engaging said shaft and secured to the sliding tube within a clearance slot for accurately keying the anchor tube and sliding tube in position, an anchor plate, a flanged shaft engaging said anchor plate and also engaging a thrust bearing, a threaded bushing having a bore, a micrometer adjusting screw engaging the bore in said bushing, a keyway for said micrometer adjusting screw, a tapered threaded plug for adjusting the tightness of the micrometer screw, a thimble support at the other end of the micrometer screw receiving a micrometer graduated thimble, a knurled disc having a spinning bore and threaded center bore for engaging said shaft, said adjusting screw engaging the inside micrometer threads of the sliding tube, said sliding tube having a flange stop for receiving a tubular graduated ring and gage rings having marginal clearance slots positioned therein, said sliding tube having opposite the flange end threaded means for securing the tubular graduated ring and gage rings rigidly to said sliding tube.

2. In a tubular height gage, an anchor tube and sliding tube, keying means for said sliding tube and anchor tube, a graduated sleeve or ring and gage rings received on said sliding tube and having marginal clearance slots and measuring surfaces, a slide ring slidably fitting the exterior surface of said gage rings, or mechanism for engaging in predetermined fixed relation said gage rings and slide ring, said slide ring having means for holding an indicator or scriber firmly in place.

References Cited in the file of this patent

UNITED STATES PATENTS

| 2,232,824 | Maher | Feb. 25, 1941 |
| 2,478,518 | Zysk | Aug. 9, 1949 |
| 2,544,004 | Bauer | Mar. 6, 1951 |
| 2,611,186 | Noble | Sept. 23, 1952 |
| 2,713,208 | Bizzocco et al. | July 19, 1955 |

FOREIGN PATENTS

| 1,001,222 | France | Oct. 24, 1951 |